INVENTORS
William E. Brown
Robert W. Campbell
BY
C.R. Meland
THEIR ATTORNEY

May 17, 1966  W. E. BROWN ET AL  3,252,025
ROTOR FOR DYNAMOELECTRIC MACHINES
Filed Aug. 3, 1961  2 Sheets-Sheet 2

INVENTORS
William E. Brown
Robert W. Campbell
BY
C. R. Meland
THEIR ATTORNEY

United States Patent Office 3,252,025
Patented May 17, 1966

3,252,025
ROTOR FOR DYNAMOELECTRIC MACHINES
William E. Brown and Robert W. Campbell, Anderson, Ind., assignors to General Motors Corporation, Detroit, Mich., a corporation of Delaware
Filed Aug. 3, 1961, Ser. No. 129,006
10 Claims. (Cl. 310—168)

This invention relates to rotors for dynamoelectric machines such as alternating current generators and more particularly to a rotor that has a noise suppressor ring formed of nonmagnetic material.

One of the objects of this invention is to provide a rotor that is comprised of two pole members that are press-fitted to a shaft that also carries a field coil assembly, the pole members having axially projecting fingers which interleave and which have inner surfaces that are engaged by a solid imperforate noise suppressor ring which is formed of a nonmagnetic material such as aluminum and which stresses the fingers outwardly.

A further object of this invention is to provide a rotor of the type described wherein the nonmagnetic noise suppressor ring is not welded or brazed to the fingers of the pole members but, rather stresses the fingers of the rotor pole members outwardly without being secured to the fingers.

Another object of this invention is to provide a rotor of the type described wherein the fingers of the pole members have inner inclined surfaces which engage the noise suppressor ring.

Still another object of this invention is to provide a method of manufacturing a rotor for a dynamoelectric machine the steps comprising, providing a shaft, press-fitting a pole member to the shaft, forcing a noise suppressor ring into the fingers of the pole member and then press-fitting another pole member to the shaft and forcing the pole members together and into tight engagement with the noise suppressor ring.

Further objects and advantages of the present invention will be apparent from the following description, reference being had to the accompanying drawings wherein preferred embodiments of the present invention are clearly shown.

Figure 1:
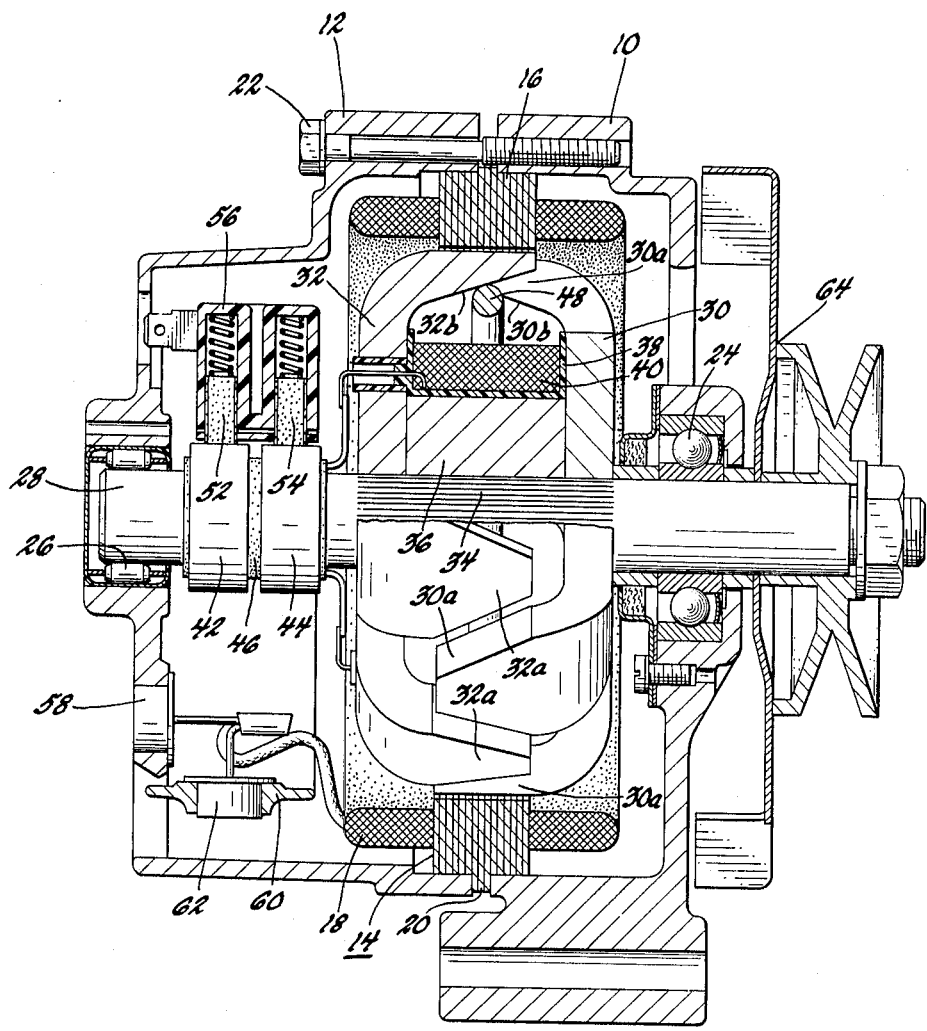
FIGURE 1 is a vertical sectional view of a dynamoelectric machine which has a rotor made in accordance with this invention.

Referring now to the drawings and more particularly to FIGURE 1, the reference numeral 10 designates an end frame for the dynamoelectric machine which is formed of metal material and is preferably formed of die cast aluminum. The reference numeral 12 designates a second end frame for the dynamoelectric machine which is likewise preferably formed of a die cast aluminum material. The end frames 10 and 12 support a stator assembly which is generally designated by reference numeral 14.

The stator assembly 14 includes the stack of steel stator laminations 16 which has slots that receive a three phase Y-connected stator winding 18. The intermediate stator laminations 20 are of larger diameter than the other stator laminations and these larger diameter laminations 20 are positioned between the end frames 10 and 12 and are clamped between these end frames. The end frames 10 and 12 are held together by a plurality of bolts 22 and annular surfaces of the end frames clamp the larger diameter stator laminations 20. The end frame 10 carries a bearing 24 whereas the end frame 12 carries a bearing 26. The bearings 24 and 26 rotatably support a shaft 28 which forms a part of a rotor assembly.

Figure 2:
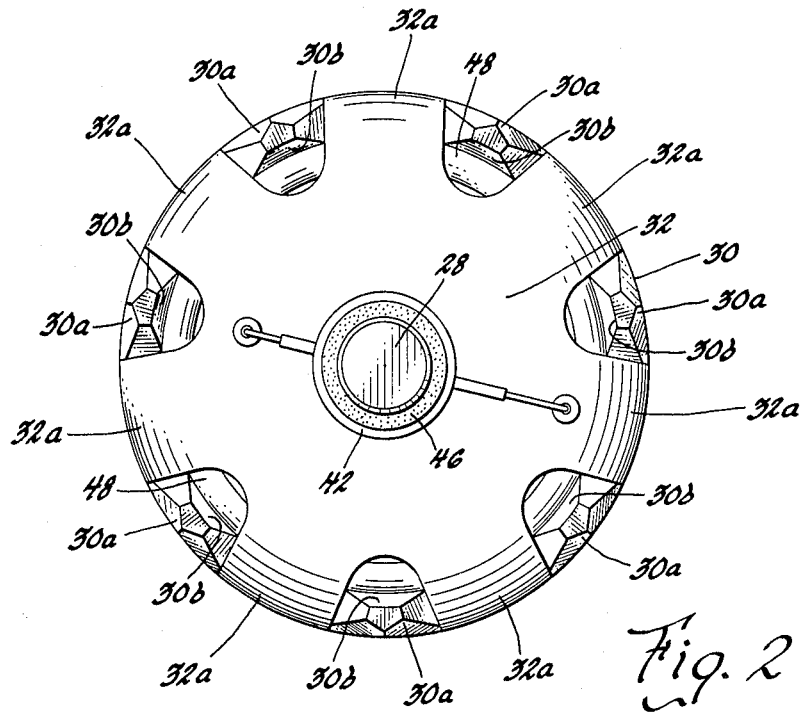
FIGURE 2 is an end view of the rotor of the dynamoelectric machine illustrated in FIGURE 1.

The rotor assembly in addition to the shaft 28 includes the pole members 30 and 32 which are press-fitted to a splined portion 34 of the shaft. These pole members are formed of a magnetic material such as steel. The pole member 30 has axially projecting fingers 30a which are best illustrated in FIGURES 1 and 2. The fingers 30a are formed with outwardly inclined surfaces 30b as is better illustrated in FIGURE 2. The fingers 30a as seen from FIGURE 2 are also formed with other surfaces that converge toward the tips of the fingers.

The pole member 32 has axially extending fingers 32a which are identical to fingers 30a and which have inner outwardly directed inclined surfaces 32b and other surfaces that converge toward the tips of the fingers. It can be seen from FIGURES 1 and 2 that the fingers 30a interleave with the fingers 32a and these fingers are circumferentially spaced from each other around the rotor.

In addition to the pole members 30 and 32, the rotor includes a core member 36 formed of magnetic material and this core member supports a coil form 38 formed of electric insulating material. The coil form 38 carries a field coil winding 40 which is connected by suitable lead wires with slip rings 42 and 44. The slip rings 42 and 44 are supported on an insulator member 46 which is press-fitted to the shaft 28.

Figure 3:
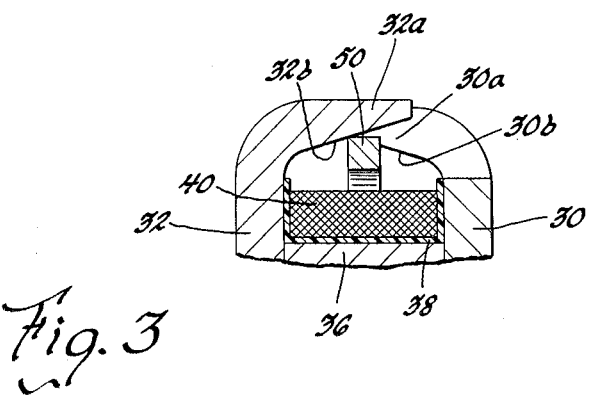
FIGURE 3 is a sectional view of a portion of FIGURE 1 illustrating a modified suppressor ring that may be used with the rotor of FIGURE 1.

The fingers 30a and 32a of the pole members 30 and 32 are stressed outwardly by a noise suppressor ring 48 which is formed of a nonmagnetic material such as aluminum. The noise suppressor ring 48 is annular in configuration and circular in cross section as seen from FIGURE 1. The suppressor ring 48 may be formed from a length of rod stock aluminum material which is bent to an annular configuration. The mating ends of the annular rod can be secured together by cold welding or may be forced together or nearly together during assembly of the rotor. In FIGURE 3, a modified noise suppressor ring is shown and is designated by reference numeral 50. This suppressor ring could be used in place of the suppressor ring 48 and has a rectangular cross-section. In FIGURE 3, the suppressor ring 50 can be formed by cutting sections away from a length of aluminum tubing and the suppressor ring therefore has a rectangular cross section but is annular in configuration.

Whether the suppressor ring is formed as shown in FIGURE 1 or formed as shown in FIGURE 3, it engages the inner outwardly inclined surfaces 30b and 32b of the fingers 30a and 32a. The suppressor ring is not welded or brazed to these fingers but does exert an outward pressure on the fingers which tends to stress the fingers outwardly.

When assembling the rotor of the dynamoelectric machine, the core member 36 and pole member 32 can first be assembled to the shaft 28. The suppressor ring 48 or 50 may then be assembled by forcing it into engagement with the inner surfaces 32b of the fingers 32a. Following this, the pole member 30 is assembled to the shaft 28 and is forced into tight engagement with the suppressor ring. By applying axial forces to the pole member 30 and 32 to force them toward each other, the noise suppressor ring 48 or 50 is wedged into tight engagement with the fingers of the pole members and therefore will stress the pole members outwardly. It will be appreciated that one of the pole members may be held fixed and the other pole member moved axially toward it to wedge the noise suppressor.

When the noise suppressor ring 48 or 50 stresses the pole fingers outwardly, the noise generated by the dynamoelectric machine during its operation is reduced because any magnetic forces tending to force the fingers of the pole members inwardly during operation of the machine are counteracted by the noise suppressor 48 or 50.

The slip rings 42 and 44 which are carried by the shaft 28 engage brushes 52 and 54 which are carried by a brush holder 56 formed of insulating material. These brushes serve to feed direct current to the field winding 40 and this direct current may be supplied from the dynamoelectric machine itself.

The dynamoelectric machine of this invention carries diodes which form a three phase full wave bridge rectifier network. To this end, the end frame 12 is fittted with three diodes 58 which are the PN junction semiconductor type and preferably of the silicon type. Only one of the diodes is shown in FIGURE 1 but it is to be understood that two other diodes are provided in suitable openings in the end frame 12.

The end frame 12 carries a metal heat sink 60 which is suitably supported and electrically insulated from the end frame 12. The heat sink 60 carries three other silicon diodes 62. The silicon diodes 62 must be of a conductivity type that is opposite to diodes 58 or in other words, the outer metal cases of the diodes 62 have a different polarity from the outer metal cases of diodes 58. The projecting terminals of respective diodes 58 and 62 are connected together and with respective phase windings of the three phase windings 18. The diodes 58 and 62 are connected with the phase windings of the stator winding 18 to form a three phase full wave bridge rectifier network having D.C. output terminals which correspond to the end frame 12 and the heat sink 60. The shaft 28 carries a combined pulley and fan 64, the fan causing air to be pulled through the dynamoelectric machine when the pulley is driven.

In the operation of this dynamoelectric machine, direct current will be supplied to the field winding 40 via the brushes 52 and 54 and the slip rings 42 and 44. This direct current can be supplied through suitable voltage regulating means from the D.C. output terminals of the bridge network that includes diodes 58 and 62. It will be apparent that when the field winding 40 is supplied with direct current and when the rotor assembly is rotated, an A.C. voltage is induced in the stator winding 18 and that this voltage will be rectified to direct current by the built-in diodes 58 and 62. The noise suppressor ring 48 rotates with the fingers 30a and 32a and continuously stresses these fingers outwardly during operation of the machine.

While the embodiments of the present invention as herein disclosed constitute a preferred form, it is to be understood that other forms might be adopted.

What is claimed is as follows:

1. A rotor for a dynamoelectric machine comprising, a shaft, a field coil assembly rotatable with and supported by said shaft including a field coil, first and second pole members having portions engaging said shaft and having axially extending interleaved fingers, said first and second pole members being supported by and rotatable with said shaft, and an annular substantially imperforate ring formed of a nonmagnetic material engaging the inner surfaces of said axially projecting fingers to stress said fingers outwardly, said ring being disunited from said fingers.

2. A rotor for a dynamoelectric machine comprising, a shaft, a metal core member press fitted to said shaft, a field coil winding supported by said metal core member, first and second pole members press-fitted to said shaft and located on opposite side of said core members, said pole members having axially extending interleaved fingers, overlying said field coil winding and a substantially annular self-supporting ring formed of an imperforate nonmagnetic metal material engaging the inner surfaces of said fingers and stressing said fingers outwardly, said ring being disunited from said fingers.

3. A rotor for a dynamoelectric machine comprising, a shaft having an intermediate splined section, a core member formed of magnetic material press-fitted to said splined section, a field coil winding supported by said core member and rotatable therewith, first and second pole members press-fitted to the splined section of said shaft and located on opposite sides of said core member, said pole members having axially extending interleaved fingers overlying said field coil winding, and an annular substantially imperforate noise suppressor ring formed of a metal nonmagnetic material engaging the inner surfaces of said pole members and stressing said fingers outwardly, said ring being disunited from said fingers and engaging only said fingers.

4. The rotor according to claim 3 wherein the suppressor ring has a circular cross section.

5. The rotor according to claim 3 wherein the suppressor ring has a rectangular cross section and is a unitary part.

6. The rotor according to claim 3 wherein the suppressor ring is formed from a section cut from aluminum tubing.

7. A rotor for a dynamoelectric machine comprising, a shaft, a field coil assembly non-rotatably secured to said shaft including a core member formed of magnetic material and a field coil winding carried by said core member, first and second pole members nonrotatably secured to and supported by said shaft having axially extending interleaved fingers, the inner surfaces of said fingers being outwardly directed, and a noise suppressor ring formed of a nonmagnetic substantially imperforate metal material engaging said outwardly directed surfaces and urging said fingers outwardly, said ring being disunited from said fingers.

8. A rotor for a dynamoelectric machine comprising, a shaft, a field coil assembly rotatable with and supported by said shaft, first and second pole members having portions engaging said shaft and having axially extending interleaved fingers, said pole members being supported by and rotatable with said shaft, and an annular member formed of nonmagnetic material engaging the inner surfaces of said axially extending fingers to stress said fingers outwardly, said member being disunited from said fingers and being formed of a rod-like material, said member rotating with said fingers.

9. The rotor according to claim 8 where the annular nonmagnetic member has a cross section which is substantially uniform throughout its length.

10. The rotor assembly according to claim 8 where the annular nonmagnetic member is split and where said split section is secured together.

References Cited by the Examiner

UNITED STATES PATENTS

| | | | |
|---|---|---|---|
| 2,243,318 | 5/1941 | Rawlings | 310—254 X |
| 2,470,596 | 5/1949 | Winther | 310—263 |
| 2,483,024 | 9/1949 | Roters | 29—155.53 |
| 2,763,916 | 9/1956 | Korski | 29—155.53 |
| 2,795,715 | 6/1957 | Gilchrist | 310—261 |
| 2,874,008 | 2/1959 | Orte et al. | 310—51 |
| 2,928,963 | 3/1960 | Bertsche | 310—168 |
| 2,987,637 | 6/1961 | Bertsche et al. | 310—54 |
| 3,134,039 | 5/1964 | Bosch | 310—168 |

ORIS L. RADER, *Primary Examiner.*

MILTON O. HIRSHFIELD, *Examiner.*

G. P. HAAS, P. L. McBRIDE, D. F. DUGGAN,
*Assistant Examiners.*